Dec. 28, 1965  J. A. STOHR ETAL  3,225,437
FLUID-TIGHT CLOSURE OF FUEL ELEMENTS SHEATHED
WITH PARTIALLY OXIDIZED POWDERED METAL
Filed Oct. 6, 1961

INVENTORS
JACQUES ANDRÉ STOHR
CLAUDE BRIDOUX
BY Bacon & Thomas
ATTORNEYS

United States Patent Office 3,225,437
Patented Dec. 28, 1965

3,225,437
FLUID-TIGHT CLOSURE OF FUEL ELEMENTS SHEATHED WITH PARTIALLY OXIDIZED POWDERED METALS
Jacques André Stohr, 83 Rte. de Chartres, Bures-sur-Yvette, France, and Claude Bridoux, 22 Ave. Henri Barbusse, Bagneux, France
Filed Oct. 6, 1961, Ser. No. 143,330
Claims priority, application France, Oct. 18, 1960
841,643
6 Claims. (Cl. 29—473.5)

The present invention relates to fluid-tight closures for fuel elements and more particularly to such closures of fuel elements formed from powdered metals strengthened by an oxide dispersion.

It would appear that light metals such as beryllium, aluminum and magnesium, due to their small neutron capture across sections, would be highly desirable as materials for sheathing fuel rods in nuclear reactors. However, at the high operating temperatures of these reactors, aluminum and magnesium articles are too rapidly affected mechanically and further exhibit too little resistance to flow.

Recently, methods of forming articles from materials related to the cermets (ceramic metals) have been perfected. Aluminum powder of controlled grain size and oxidized to a certain degree can be extruded into a composite structure. These aluminum powders are known as "S.A.P." which stands for sintered aluminum powders and a specific example of which is "S.A.P. 865," which has a chemical composition of 14% by weight of aluminum oxide, a trace of from about 0.1 to 0.25% iron, the remainder being aluminum metal. The reason they are related to the cermets is because the extruded material is composed of grains having an oxide skin. Similar substances derived from magnesium and beryllium have also been developed.

However, articles of these materials present serious technological problems in developing suitable methods of joining them. Joining cannot be practiced by the known welding process which involves melting the material and the molten zone forms the bond after welding, since during melting the oxide skins rupture, the grains lose their identity and the oxide skins rise to the surface of the bath with a concomitant large amount of degasing.

Figure 1:
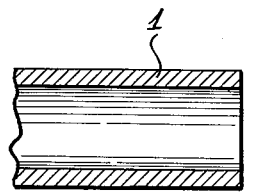

Joining by flash-welding is illustrated in diagrammatic FIGURE 1, which is a longitudinal sectional view of a sheath 1 and a plug 2, both composed of consolidated powdered materials selected from the group consisting of aluminum, magnesium and beryllium. When flash-welding of plug 2 to sheath 1 was attempted, the following difficulties were encountered:

(1) The material driven off by flashing remains enclosed in the sheath.
(2) A large volume of gas becomes trapped in the thus formed cartridge, making it difficult to weld the second plug in fluid-tight fashion, since, on heating, the trapped gas is raised to excessively high pressures.

The present invention provides a process for the joining of fluid-tight closures to fuel elements sheathed with powdered materials and obviates the foregoing discussed disadvantages.

The present invention accomplishes this result by inserting a concave plug of consolidated, slightly oxidized, powdered metal into a nuclear fuel element sheath of consolidated slightly oxidized powdered material, covering said plug and the end of said sheath with a convex counter plug of consolidated, slightly oxidized, powdered material simultaneously welding said sheath, plug and counter plug and subsequently removing said convex counter plug by machining.

Other specific embodiments of the present invention include utilizing a plug threaded to match internal threads provided on the end of said sheath, whereby the plug is screwed into the sheath before welding. Alternatively, the plug and the internal end of the sheath can be provided with similar corresponding tapers and the plug is simply driven into the sheath before welding.

Figure 2:
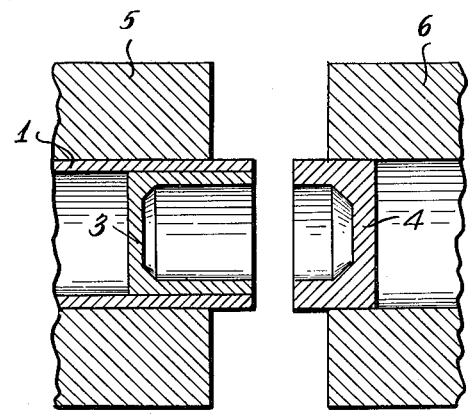
Figure 3:
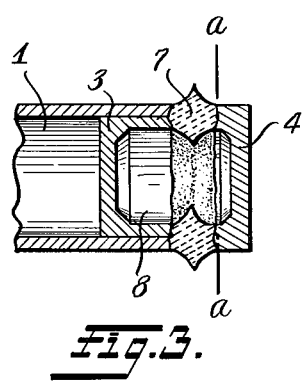
Figure 4:
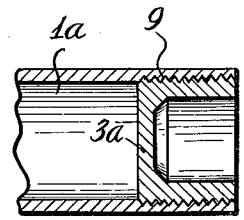
Figure 5:
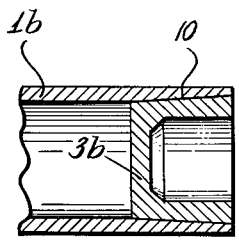

Various examples of fluid-tight closures according to the invention will be described hereinafter in relation to their method of preparation and when considered in connection with the accompanying diagrammatic figures to be described. The arrangements to be described in connection with these examples are given only in way of explanation, it being clearly understood that obviously equivalent arrangements may be utilized just as well without departing from the scope of the invention. In the accompanying drawings, like reference numerals designate like parts throughout the figures thereof and wherein:

FIGURE 2 is a longitudinal section through the various elements to be welded;
FIGURE 3 is a longitudinal section through the end of the sheath after welding;
FIGURE 4 is a longitudinal section through an alternative embodiment of a threaded layout; and
FIGURE 5 is a longitudinal section through a further embodiment of a tapered layout.

In FIG. 2, the concave plug 3 is shown disposed inside sheath 1, the counter-plug 4 being gripped in jaw 6 of the welding machine, while the assembled sheath 1 and concave plug 3 are gripped in the opposite jaw 5 of the welding machine.

In FIG. 3, the sheath 1, plug 3 and counter-plug 4 are shown welded together, the material driven out forming the bulge 7. A cut along the plane $a$—$a$ in the area of counter-plug 4 will enable the gases in the cavity 8 to be exhausted and the material driven out forming the bulge 7 can then be machined away. This process, though far more preferrable than that practiced before, still involves some disadvantages due to the risk of a faulty weld in that satisfactory joining between the sheath and counter-plug is not effected and leaks in the weld are sometimes encountered.

The following examples enable even these latter disadvantages to be overcome. In FIG. 4, the internal end of the sheath 1a is threaded at 9 as is the plug 3a and they are assembled by screwing the threaded plug 3a to the threaded sheath 1a before welding. Threads 9 provide the electrical contact between the threaded sheath 1a and threaded plug 3a and impart mechanical rigidity to the assembled pieces so that they behave as a single piece during welding.

Test welds were made on tubes 26–28 mm. in diameter formed from consolidated "S.A.P. 865" material with the following conditions:

Current: 35,000 A.
Compression stroke: 4 mm.
Compression speed: 800 mm./sec.
Flash speed: 7 mm./sec.
Compression pressure: 3,000 Kg.

Attempts to tear the weld away by bending, eliminating the intrinsic resistance of the thread, show that the weld is excellent and that its resistance is in the vicinity of that of the base material. In axial tearing tests, tearing clearly starts at the base of the thread by the notch effect, and the resistance of the plug corresponds to that of the sheath.

In FIG. 5, the threaded plug is replaced by a taper 10 on the plug 3b and a corresponding tapered portion in the internal end of the sheath 1b. The tapered plug 3b is driven into the tapered end of the sheath 1b before welding. The compression set up during welding then provides improved contact between the tapered sheath and the tapered plug and results comparable to those discussed with respect to the threaded plug are obtained.

It should be understood, of course, that the foregoing disclosure relates to only preferred embodiments of the invention and that numerous modifications or alterations may be made therein without departing from the spirit and the scope of the invention as set forth in the appended claims.

What is claimed is:

1. A process for forming a fluid-tight closure of a nuclear fuel element sheath composed of consolidated, slightly oxidized, powdered metal, comprising the steps of inserting a concave plug of consolidated, slightly oxidized, powdered metal into said fuel element sheath, covering said plug and the end of said sheath with a convex counter-plug of consolidated, slightly oxidized, powdered metal, simultaneously welding said sheath, plug and counter-plug and subsequently removing the excess metal by machining.

2. A process according to claim 1 wherein the exterior of the plug and the internal end of the sheath are threaded, and the plug is screwed into the sheath before welding.

3. A process according to claim 1 wherein the exterior of the plug and the internal end of the sheath are tapered, and the plug is driven into the sheath before welding.

4. A process according to claim 1 wherein the welding is effected by flash-welding.

5. A process according to claim 1 wherein the excess material formed during welding is removed by machining.

6. A process according to claim 1 wherein the fritted, slightly oxidized metal is selected from the group consisting of aluminum, beryllium and magnesium.

References Cited by the Examiner
UNITED STATES PATENTS

| | | | |
|---|---|---|---|
| 1,971,369 | 8/1934 | Coryell | 219—104 |
| 1,993,269 | 3/1935 | Fletcher. | |
| 2,440,999 | 5/1948 | Anderson. | |
| 2,927,071 | 3/1960 | Huey | 176—79 |
| 2,991,601 | 7/1961 | Glatter et al. | |
| 3,089,021 | 5/1963 | Hawes et al. | 219—104 |
| 3,118,819 | 1/1964 | Alfille et al. | 176—79 |

OTHER REFERENCES

Nuclear Fuel Elements (Hausner and Schuman) published by Reinhold Pub. Corp. (London) 1959. (Page 269 relied on.)

JOHN F. CAMPBELL, *Primary Examiner.*

C. I. SHERMAN, P. M. COHEN, *Assistant Examiners.*